May 6, 1930.  E. F. MAAS  1,757,934
CENTRIFUGAL TIRE FORMING MACHINE
Filed Dec. 13, 1924   5 Sheets-Sheet 1

INVENTOR
ELOF F. MAAS
BY
ATTORNEY

May 6, 1930.  E. F. MAAS  1,757,934
CENTRIFUGAL TIRE FORMING MACHINE
Filed Dec. 13, 1924   5 Sheets-Sheet 3

INVENTOR
ELOV F. MAAS
BY
ATTORNEY

May 6, 1930.  E. F. MAAS  1,757,934
CENTRIFUGAL TIRE FORMING MACHINE
Filed Dec. 13, 1924   5 Sheets-Sheet 4

INVENTOR
ELOV F. MAAS
BY
ATTORNEY

May 6, 1930.  E. F. MAAS  1,757,934
CENTRIFUGAL TIRE FORMING MACHINE
Filed Dec. 13, 1924   5 Sheets-Sheet 5

INVENTOR
ELOV F. MAAS
BY
ATTORNEY

Patented May 6, 1930

1,757,934

UNITED STATES PATENT OFFICE

ELOV F. MAAS, OF AKRON, OHIO, ASSIGNOR TO THE GOODYEAR TIRE & RUBBER COMPANY, OF AKRON, OHIO, A CORPORATION OF OHIO

CENTRIFUGAL TIRE-FORMING MACHINE

Application filed December 13, 1924. Serial No. 755,772.

My invention relates to a method of and machine for shaping or forming flat built pneumatic tire casings into their ultimate arcuate cross-sectional contour.

One object of my invention consists in providing a novel method of shaping flat built tires into an arcuate cross-sectional contour consisting of utilizing centrifugal force. Another object of my invention consists in providing a machine adapted to facilitate the formation of the tire casings by the method referred to.

Heretofore, pneumatic tire casings have usually been built in substantially the arcuate cross-sectional form which they must ultimately assume. However, another approved method in the manufacture of tire casings consists of building the casing in an endless flat band, and subsequently shaping it to the desired arcuate form prior to the vulcanization thereof. This has been accomplished by placing the built-up green or uncured tire casing within a partially closed mold together with a pneumatic core, more commonly known as an air bag. The air bag employed for this purpose is a special type having an inner metallic reinforcing surface and is inflated by means of compressed air until the tire casing is stretched to substantially the proper form. An air bag of the ordinary type is then inserted in the casing, which is placed in a solid mold and cured, or vulcanized, thus causing it to retain the desired form.

My present invention consists primarily in the shaping of green or uncured tires by a novel method and a new type of machine. It consists in first placing a deflated air bag inside of the flat built tire casing in such position that it is in alinement with the center of the tread portion thereof. The air bag and the casing, secured in proper position relative to each other, are then placed upon a rotatable member which is rotated at a relatively high rate of speed. The centrifugal force of the air bag, and also of the casing itself, causes it to assume the desired arcuate cross-sectional form. The casing and associated air bag are placed within a mold and the bag is inflated for the purpose of maintaining the desired pressure during curing, as has been proven to be desirable in practise.

For a better understanding of my invention reference may be had to the accompanying drawings, of which:

My present invention is particularly adapted to be operated in conjunction with an invention disclosed in my co-pending application Serial Number 755,773, referred to above and filed of even date herewith.

Figure 1:
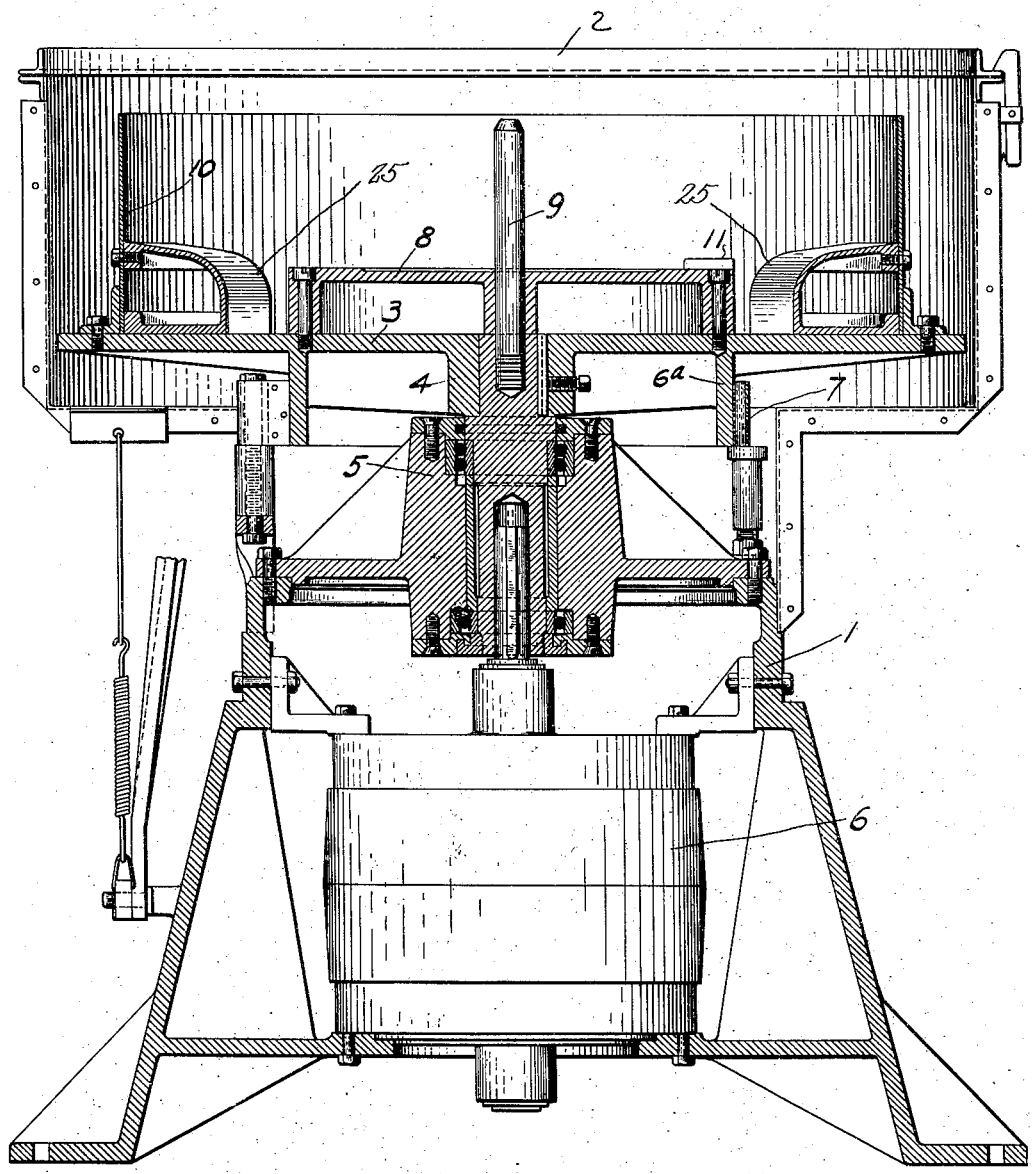
Fig. 1 is a cross-sectional view of a machine constructed in accordance with my invention.
Figure 2:
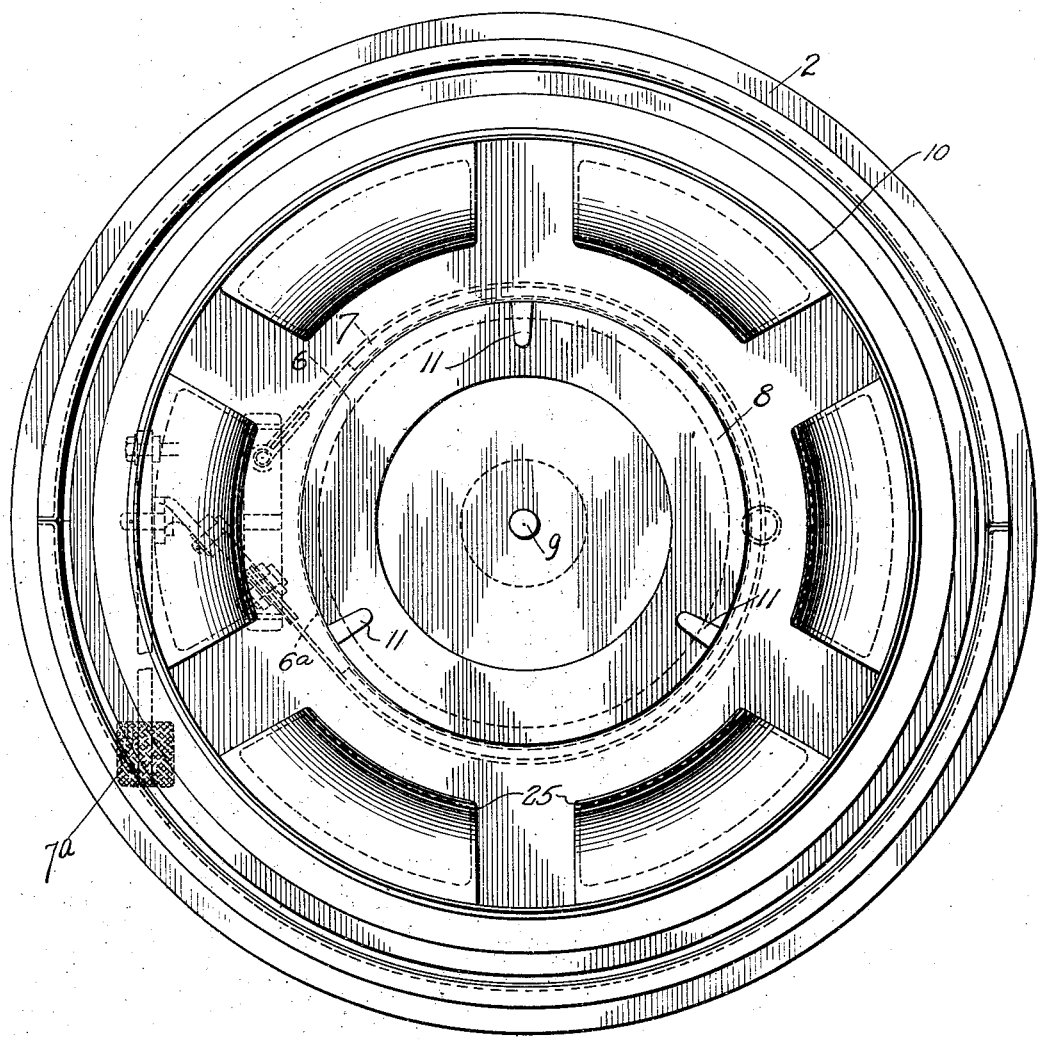
Fig. 2 is a plan view of the machine illustrated in Fig. 1.

Referring to the drawings, I have shown a machine 1 provided with a stationary upper housing 2 of greater diameter than the remainder thereof within which is housed a rotatable table 3. The table 3 is mounted upon a shaft 4 which is supported by a bearing 5 and has connected on the lower end thereof an electrical motor 6, which serves to rotate the shaft 4 and the table 3. On the lower side of the table 3 is mounted a brake drum 6ª, adapted to cooperate with a braking mechanism 7, by means of which the speed of the table 3 may be decreased at will. The braking mechanism is actuated by a foot lever 7ª, as best shown in Fig. 2. Upon the table 3 is disposed a centrally located raised annular portion or platform 8, through the center of which a vertically disposed centering pin 9 extends. The table is also provided with a vertical circumferentially extending flange 10 at the outer edge thereof, the purpose of which will be hereinafter described. The platform 8 is provided with lugs or projections 11 on the upper face thereof, as best shown in Fig. 1.

Figure 5:
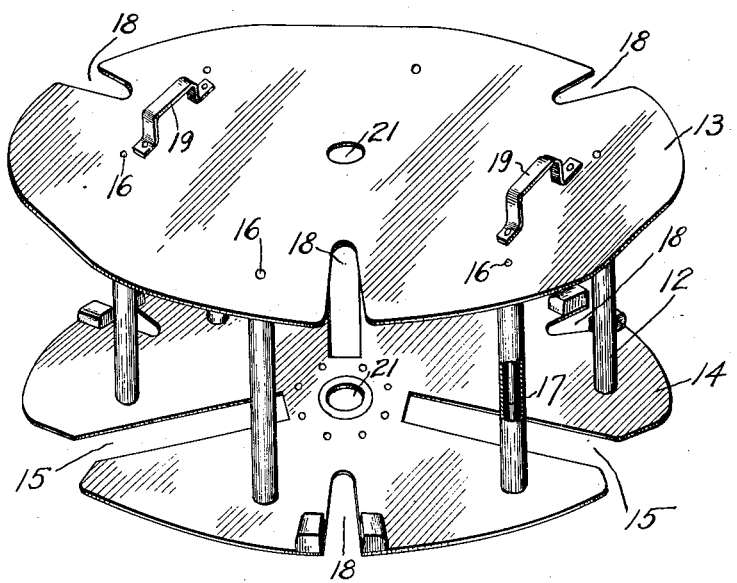
Fig. 5 is a perspective view of an air bag supporting structure employed in practising my invention.

The table 8 is adapted to receive an air bag supporting member 12, as best shown in Fig. 5. This member comprises two sheet metal side members 13 and 14. The lower member 14 is provided with three equally spaced, oppositely disposed, substantially radially extending slots 15. The plates are fastened together by means of a plurality of bolts 16 disposed one on each side of the slots 15 and each provided with a roller member 17 thereon. The plates 13 and 14 are also provided with notches 18 which are adapted to receive the stem of the air bag when the bag is placed upon the supporting frame 12. The plate 13 is provided with two handles 19 by means of which the frame 12 may be carried about.

As best described in my co-pending application, previously referred to, the air bag is placed about the member 12 by passing the valve stem thereof through one of the slots 18, thus insuring proper disposition thereof when the bag is buckled and is buckled inwardly at three symmetrically located points by means of arms which pass into the slot 15. After the bag has been collapsed around the member 12, a flat built casing is placed thereover and the bag is permitted to expand thereagainst, precautions being taken to insure that the bag will engage exactly the central portion of the casing. The tendency of the bag to straighten out causes considerable frictional engagement with the casing, and enables the operator to pick up the bag, the casing and the frame 12 as a unit by lifting upon the handles 19.

The frame 12, with an air bag and flat built casing mounted thereon, is then seated upon the table 8, with the lugs 11 projecting into the slots 18 in member 12, and the centering pin 9 extending through openings 21 in the center of the plates 13 and 14 for the purpose of insuring proper disposition of the member 12 on the table 3.

Figure 3:
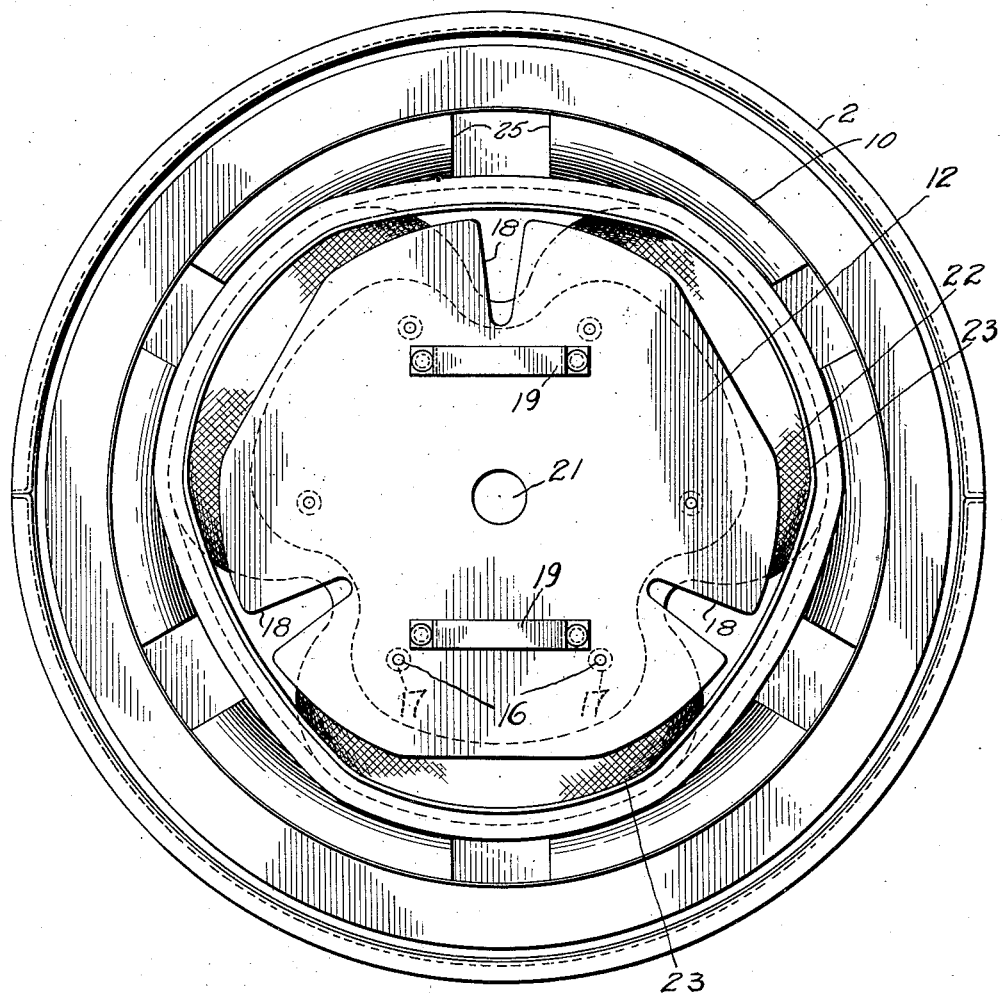
Fig. 3 is a plan view of a machine constructed in accordance with my invention, having mounted thereon a flat built tire casing and an associated flexible pneumatic core, as prepared in accordance with my co-pending application, Serial No. 755,773, filed December 13, 1924, showing the relative positions of the tire casing and pneumatic core prior to practising my present invention thereon.

The relative positions of the supporting frame 12, a buckled air bag or pneumatic core 22 and an associated endless flat built casing 23, at the time the member 12 is first placed on the platform 8, is best illustrated in Fig. 3.

Figure 4:
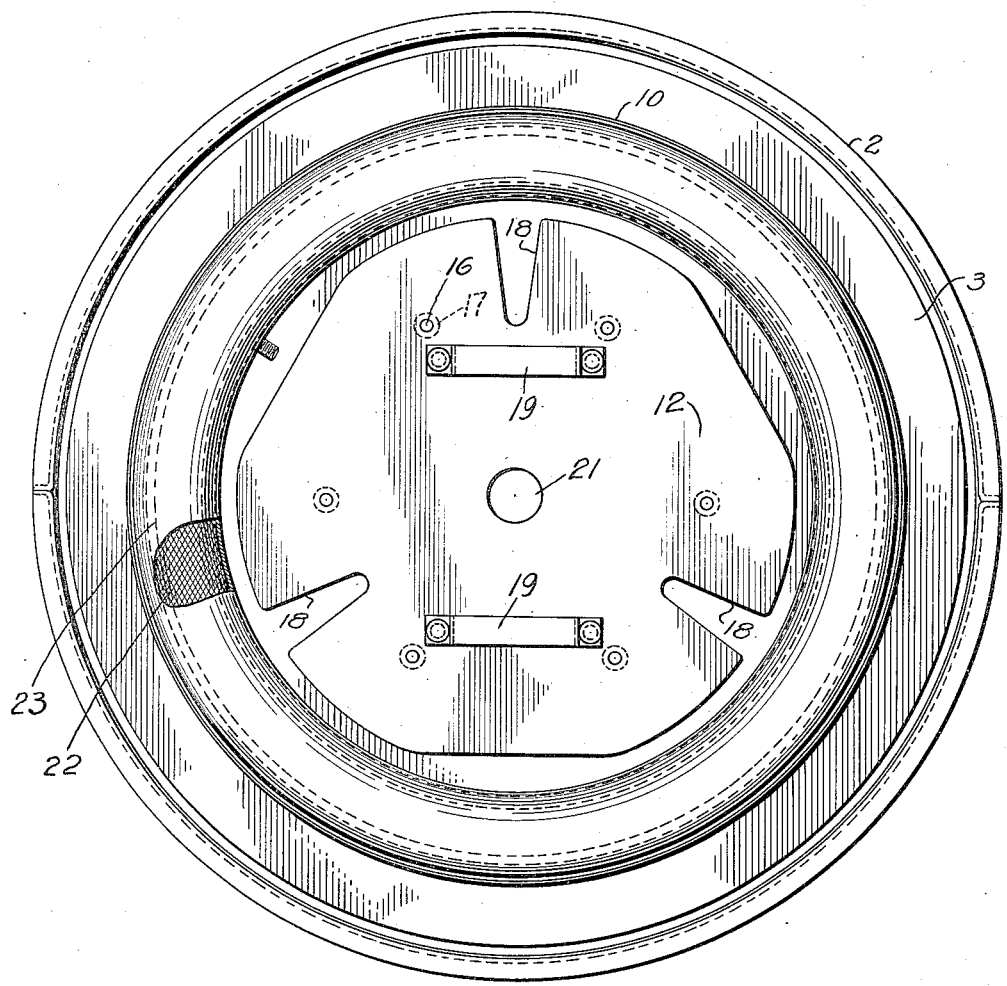
Fig. 4 is a view of my machine similar to Fig. 3, except that the casing and air bag are shown in their relative positions occupied after operation of the machine.

After the member 12 is placed on the platform 8, the motor 6 is energized by means of a suitable controller, not shown, causing the table 3, the platform 8, and the member 12 disposed thereon, to rotate. By means of the frictional engagement of the member 12 upon the upraised portion 8, and also by means of the lugs 11 of the plate 8 extending within the slots 18 of the member 14, the member 12 with its accompanying air bag and casing is rotated. It has been determined that, for certain types of tire casings, it is desirable that the table 3 be rotated at a speed of approximately 600 revolutions per minute. The centrifugal force developed by this rotation causes the central portion of the tire to tend to move outwardly. In addition, the centrifugal force of the air bag is exerted against the central portion of the casing, and the combined forces cause the outward movement or stretching of the central portion of the casing. The two edges, or bead portions, remain of substantially their original dimensions on account of the fact that they are sufficiently stiff to resist stretching at the speed of rotation employed. The casing, being green, or uncured, will expand under the centrifugal force until it engages the annular flange 10, which supports the same and prevents undue stretching thereof. During the stretching or shaping of the casing, the air bag is permitted to assume its natural circular position. When the casing 23 has assumed the desired position, the table 3 is stopped, in order to save time, by means of the braking mechanism 7. At this time the casing 23 and air bag 22 have assumed the form illustrated in Fig. 4. After the casing has been shaped and the operation of the apparatus discontinued, the casing rests partially upon supports 25 that are secured in spaced relation to the upper portion of the table 3 and to the inner periphery of the flange 10.

The casing 23 with the air bag 22 thus inserted is then placed within a curing mold and air pressure applied to the air bag to secure the desired pressure necessary for curing of the tire.

It will be apparent from the foregoing description that I have disclosed a novel method of shaping a flat built tire casing which consists of the suitable application of centrifugal force thereto. Also, it will be apparent that I have provided a machine particularly adapted to accomplish this purpose, the novel features of which have been herein set forth.

Although I have disclosed but a single form which my invention may assume and have described in detail but a single application thereof, it will be apparent to those skilled in the art that it is not so limited, but that various minor modifications and changes may be made therein without departing from the spirit of my invention, or from the scope of the appended claims.

What I claim is

1. The method of forming a built up tire band into a tire casing which consists in rotating the band and forcing the portion of the bad intermediate its edge portions outwardly by centrifugal action due to such rotation.

2. The method of forming a built up tire band into a tire casing which consists in rotating the band and a body applied to the same and forcing the portion of the band intermediate its edge portions outwardly by centrifugal action due to such rotation.

3. The method of shaping flat built tire casings which comprises applying centrifugal force uniformly to the casing radially thereof until it assumes an arcuate cross-sectional form.

4. The method of shaping flat built pneumatic tire casings which comprises inserting a flexible member therein and rotating the same at a relatively high rate of speed, thereby changing the form of the casing by centrifugal force, into substantially toroidal shape.

5. The method of shaping flat built pneumatic tire casings which comprises disposing a flexible member in juxtaposition to the center of the casing and rotating the same at a sufficiently high rate of speed to cause the centrifugal force of the flexible member and of the casing to force the casing into the desired form.

6. The method of shaping flat built pneumatic tire casings which comprises buckling a flexible pneumatic core at a plurality of points, disposing them in a buckled position centrally within a casing, and rotating the same until centrifugal force developed therein shapes the casing into tire form.

7. The method of shaping flat built pneumatic tire casings which comprises disposing a flexible air bag about a supporting frame, buckling the bag at a plurality of points, disposing a flat built tire casing about said frame and said air bag, disposing said frame, said bag and said casing as a unit upon a centrifugal machine, and rotating the same at a relatively high rate of speed.

8. A machine for shaping flat built pneumatic tire casings which comprises a rotatable member, means for rotating said member at a relatively high rate of speed, and means for supporting a tire casing having an air bag disposed therein concentrically with respect to said rotatable member.

9. A machine for shaping flat built pneumatic tire casings which comprises a rotatable table, a member adapted to support a flat built tire casing and an air bag disposed within said casing, said table being adapted to receive and support said casing supporting member, and means for rotating said table.

10. A machine for shaping flat built pneumatic tire casings which comprises a rotatable table having a centrally disposed raised portion, an annular raised flange disposed about the perimeter of said table, and means for rotating said table.

11. A machine for shaping flat built pneumatic tire casings comprising means for supporting a casing, means for utilizing centrifugal force to shape said casing, and means arranged circumferentially of the supporting means for preventing injury to said casing during the shaping operation.

12. A machine for shaping flat built pneumatic tire casings comprising means for supporting a casing, means for utilizing centrifugal force applied substantially in plane of the casing to shape said casing, and means connected to the first mentioned means for preventing excessive stretching of said casing.

13. The method of forming a built up tire band into a tire casing which consists in rotating the band and forcing the portion of the band intermediate its edges outwardly by centrifugal action due to such rotation while advancing at the same time the two edges of the band towards one another.

14. The method of forming a built up tire band into a tire casing which consists in rotating the band and a body applied to the same and forcing the portion of the band intermediate its edge portions outwardly by centrifugal action due to such rotation while advancing at the same time the two edges of the band towards one another.

In witness whereof, I have hereunto signed my name.

ELOV F. MAAS.